June 24, 1947. E. G. KESLING Re. 22,892
GEAR SHIFTING MECHANISM
Original Filed July 20, 1935
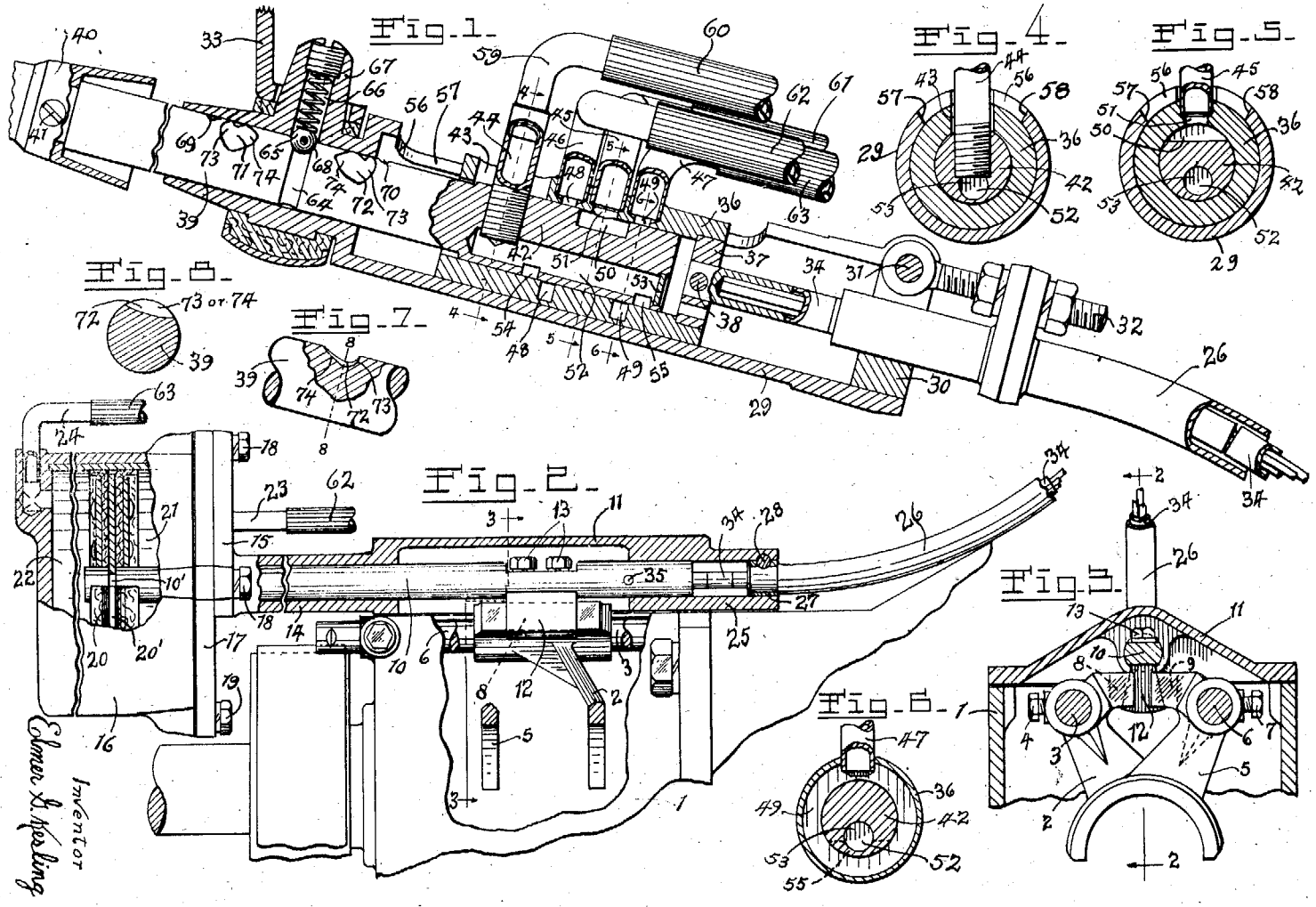

Reissued June 24, 1947

Re. 22,892

UNITED STATES PATENT OFFICE 22,892

GEAR SHIFTING MECHANISM

Elmer G. Kesling, Bloomfield, Mo.

Original No. 2,069,526, dated February 2, 1937, Serial No. 32,366, July 20, 1935. Application for reissue December 17, 1938, Serial No. 246,454

18 Claims. (Cl. 74—335)

This invention relates to gear shifting mechanism, and has special utility as a part of the transmission gearing of automobiles and other vehicles. This improved gear shifting mechanism is of that type in which manual energy is used to effect the selecting movements and to regulate valve mechanism for controlling fluid energy to effect the shifting movements, with the added feature of effecting the shifting movements by manual energy in case the fluid energy fails to effect the shifting movements, or in case no fluid energy is being supplied, and utilizing the same movements to effect manual shifting as in effecting the valve regulation.

The flexible shaft shown in this application is shown and claimed in my prior Patent No. 2,036,528, dated April 7, 1936.

Objects of the invention are to provide an actuator having rotative selective movements and longitudinal shifting movements in which both the manual and the power devices are directly connected to the actuator; to provide a mechanism capable of free operation and requiring a minimum of effort to effect the operation of selection and of valve control; to provide a construction and arrangement of cooperative parts whereby complete selecting and shifting operations may be manually performed, if desired; to provide mechanism wherein manual force is normally used to effect selection and valve regulation only, and other means to effect the shifting movements; to provide mechanism wherein like movements of the manual operating means to effect valve regulation of a given shifting movement are made to effect manually the same shift; and to provide means for positively stopping the manual valve operating means at a predetermined point for the required fulfillment of movement to complete each of the several shifts effected by power means.

Various other objects and advantages of the invention will be made apparent from the following description, reference being made to the annexed drawings, in which—

Fig. 1 is a vertical longitudinal section of the manual control shown attached to the instrument panel of an automobile.

Fig. 2 is a view partly in section approximately on the line 2—2 of Fig. 3, showing the application of the shifting mechanism to the transmission of an automobile.

Fig. 3 is a sectional view approximately on the line 3—3 of Fig. 2.

Fig. 4 is a sectional view on the line 4—4 of Fig. 1.

Fig. 5 is a sectional view on the line 5—5 of Fig. 1.

Fig. 6 is a sectional view on the line 6—6 of Fig. 1.

Fig. 7 is a view partly in section of a portion of the shaft 39, showing said shaft 39 turned to the point where the stop-notch 72 is at the top of said shaft 39.

Fig. 8 is a sectional view on the line 8—8 of Fig. 7.

The customary gear case 1 contains the usual selective gears (not shown). A yoke 2 for shifting the gears either into high or intermediate speeds is secured to a shift rail 3 by a bolt 4; and a yoke 5 for shifting the gears either into low or reverse speeds is secured to a shift rail 6 by a bolt 7. Notches 8 and 9 are formed in a part of the yokes 2 and 5, respectively. The customary spring plungers and interlock are used in connection with the shift rails 3 and 6.

A spindle 10 is mounted for rocking and longitudinal movements in the gear case cover 11. A block 12 selectively engageable with the notches 8 and 9 is secured to the spindle 10 by bolts 13, or otherwise attached thereto. A tubular projection 14 extending from one end of the cover 11 gives bearing to the adjacent end of the spindle 10, and has an integral plate 15 formed on the extended end thereof. A cylinder 16 and cylinder head 17 are secured to the plate 15 by bolts 18. A bolt 19 attaches the lower part of the cylinder head 17 to the cylinder 16.

The spindle 10 projects into the cylinder 16 and has a circumferential groove 10′ near the end thereof within the cylinder 16 to which a piston 20 is secured by a two-piece disk 20′. The groove 10′ and the disk 20′ allow the spindle 10 to turn in the piston 20, but do not permit relative longitudinal movement between the spindle 10 and the piston 20. The piston 20 divides the cylinder into chambers 21 and 22. A tube 23 is secured in a wall of the cylinder 16 and communicates with the chamber 21. A tube 24 is secured in a wall of the cylinder 16 and communicates with the chamber 22. The cylinder 16 may be placed any desirable distance from the gear case, and if necessary can be additionally supported by any convenient stationary part of the automobile. A tubular projection 25 extends from the other end of the cover 11 and provides a bearing for the adjacent end of the spindle 10.

One end of a curved tube 26 is secured in the end of the projection 25 by a bushing 27 and a bolt 28. The other end of the curved tube 26 is adjustably secured to a supporting member 29 by an open-walled tubular block 30 and the bolts 31 and 32. The supporting member 29 is secured to the instrument panel 33 by bolts (not shown). A flexible shaft 34 is supported and guided in the curved tube 26. One end of the flexible shaft 34 is secured in an axial bore in the end of the spindle 10 by a pin 35. The other end of the flexible shaft 34 is attached to one end of a tubular element 36 mounted for longitudinal and turning movements in the support 29. The attachment between the shaft 34 and the tubular element 36 is rigid and comprises a washer 37 and a pin 38 passing through said parts (Fig. 1). The inner surface of the tubular element 36 constitutes a valve seat.

An operating shaft 39 is mounted for rocking and longitudinal movements in one end of the member 29. One end of the operating shaft 39 projects beyond the end of the member 29, and an operating handle 40 is secured thereto by a screw 41. The other end of the operating shaft 39 is integral with an element 42 mounted for longitudinal sliding movements in the tubular element 36, extent of such longitudinal movement being limited by a slot 43 in the element 36 and a tube 44 extending through said slot and screwed into the unitary element 39, 42. Thus, a lost motion connection between the elements 39 and 36 is provided, and the actuator spindle 10 for the shifter elements may be turned into selective engagement with said shifter elements by manual turning movements of the shaft 39, and may be moved longitudinally in shifting operations by manual longitudinal movements of the shaft 39. The elements 36 and 42 are cooperatively associated and formed to constitute a valve means controlling energization of the power device 20, etc.

One end of each of the tubes 45, 46 and 47 is soldered or otherwise secured in the wall of the tubular element 36 in longitudinal alignment with the slot 43. Circumferential grooves 48 and 49 are provided in the inner wall of the element 36 and communicate with the tubes 46 and 47, respectively. The grooves 48 and 49 are ports and will hereinafter be referred to as port 48 and port 49, respectively. A notch in the side of the valve member 42 forms the intake port 50 which communicates with the tube 45 by a hole 51 through the adjacent wall of the element 36. A hole 52 is bored into the valve member 42 and is closed adjacent the free end of the member 42 by a disk 53 secured therein by solder or otherwise (Fig. 6). A slot in the wall of the hole 52 forms an exhaust outlet 54 which may be made to communicate with the port 48; and another slot in the wall of the hole 52 forms an exhaust outlet 55 which may be made to communicate with the port 49 (Fig. 1). The tube 44 opens into the hole 52.

The tubes 44, 45, 46 and 47 all extend through a substantially wide slot 56 through the wall of the supporting member 29. The slot 56 limits the extent of rocking movements of the operating parts 36, 39, 40, etc., by a side of the tube 44 encountering one or the other of the side walls 57 or 58 of the slot 56. It is noted that the tube 44 has a larger diameter than the tubes 45, 46 and 47.

One end of a tube 59 is secured by solder or otherwise into the projecting end of the tube 44. The other end of the tube 59 is connected to an air cleaner (not shown) by a rubber tube 60. Said air cleaner may be the one customarily used in connection with the carburetor of the automobile. The projecting end of the tube 45 is connected to the exhaust manifold (not shown) of the automobile, by a rubber tube 61. The projecting ends of the tubes 23 and 46 are connected by a rubber tube 62, and the projecting ends of the tubes 24 and 47 are connected by a rubber tube 63. It is understood that these tubes 60 to 63, inclusive, may be made of any other air-tight flexible material. A neutral groove 64 is provided on the operating shaft 39 for engagement of a spring pressed ball 65 which is mounted in a hole 66 in a projection 67 formed on the member 29. The groove 64 is cut deeper at the proper point to form a neutral lock 68 for locking the operating shaft 39 against longitudinal movements from neutral position while positioned approximately in the center of its arc of rotation.

Stop-notches 69, 70, 71 and 72 are properly formed along the operating shaft 39 and are respectively engaged by the ball 65 to stop the movement of the operating shaft 39 at the proper point for the completion of the power shifting movements into reverse, low, intermediate and high speed positions, respectively. Each of these stop-notches has an abrupt wall 73 which is located on the side away from the neutral groove 64, and a sloping wall 74 which is on the side toward the groove 64. It is obvious that none of these notches 69, 70, 71 or 72 can be moved past the ball 65, because the notch is deep enough to prevent the ball from raising over the abrupt wall 73; and it is clear that the notch can be moved from the ball 65 in the opposite direction; that is, away from the wall 73, because the ball 65 will raise over the sloping wall 74.

In the operation of the device, the operating handle 40 is turned until a side of the tube 44 encounters a side wall 57 or 58 of the slot 56, which turned position is the fully selected position. This turning movement, if made in neutral position, unlocks the ball 65 from the neutral lock 68 and places the notches 69—70 or 71—72, as the case may be, in longitudinal alignment with the ball 65; and, through the flexible shaft 34, turns the actuating spindle 10 and block 12 to engage the block 12 in one or the other of the notches 8 or 9 and entirely free from that notch 8 or 9 which is not engaged, after which longitudinal movement of the parts will effect shifting of the selected gear.

Therefore, in making a shift into reverse speed by power means, starting from neutral position, which is the position shown in the drawings, selection is made by manually turning the handle 40 clockwise to fully selected position. This turning movement will disengage then neutral lock 68 from the ball 65 and place the stop-notch 69 in longitudinal alignment with the ball 65 and, through the flexible shaft 34 and connected parts, turn the spindle 10 and cause the block 12 to engage the notch 9 and entirely free itself from the notch 8, after which the handle 40 and shaft 39 are initially moved inwardly to open the valve and place the intake port 50 in communication with the port 49, and the exhaust port 54 with the port 48; whereupon vacuum energy through the hole 51 and tube 45—61 will deplete the air from the chamber 22 through the tube 24—63—47, while atmospheric air will rush into the chamber 21 through the tube 60—59—44, hole 52, port 54, port 48 and tube 46—62—23, and push the piston 20 to the left, as shown in Fig. 2, to effect reverse speed position through the longitudinal movement of the spindle 10, block 12, notch 9 and yoke 5, which movement will finally move the shaft 34 and the element 36 together with the ports 48 and 49 in the same direction to close the valve. The inward movement of the shaft 39, etc., will be continued until the wall 73 of the stop-notch 69 engages the ball 65, and the piston 20, spindle 10, etc. will follow until the port 49 overruns the port 50 and closes the valve and completes the movement to shift into reverse speed position.

To make the shift from reverse speed position to low speed position, the handle 40 etc. are kept turned clockwise to fully selected position, since the selected position for shifting into low is the same as for reverse, and pulled outwardly, which movement will cause the intake port 50 to communicate with the port 48, and the exhaust port 55 with the port 49, and vacuum energy through the hole 51 and tube 45—61 will deplete the air from the chamber 21 through the tube 23—62—46, while atmospheric air will rush into the chamber 22 through the tube 60—59—44, hole 52, port 55, port 49 and tube 47—63—24, and push the piston to the right, as shown in Fig. 2, to effect low speed position through the longitudinal movement of the spindle 10, block 12, notch 9 and yoke 5. This movement will also move the shaft 34, and the valve element 36 together with the ports 48 and 49 in the same direction. The outward movement of the operating shaft 39 etc. will be continued until the wall 73 of the stop-notch 70 engages the ball 65, and the piston 20, spindle 10, etc., will continue to move until the port 48 overruns the port 50 and the movement to shift into low speed position is completed.

It can here be noted that the operating handle 40, shaft 39 and valve element 36 turn through a greater number of degrees than the spindle 10 and block 12 in effecting a fully selected position. This is on account of the torsional resiliency of the flexible shaft 34. The extra amount of turn given the operating end is sufficient for the transmission of the required turning force to the operated end. On account of this torsional resiliency in the flexible shaft 34, the handle 40 etc. may be turned to the full arc of rotation or the fully selected position in either direction at any time.

If the parts are not already in neutral position and the handle 40 is turned to a selection different from that already made, the selection will be completed in the gear case 1 by the torsional resistance of the shaft 34 as soon as the parts are moved to neutral position.

It will also be noted that in case a selection has been made and a shift effected or partly effected and the manual turning force is relieved from the handle 40, the resilient action of the shaft 34 will return the handle 40 a distance toward the center of its arc of rotation, in which case, if the parts are brought to neutral position, the neutral lock 68 will engage the ball 65 and positively stop the parts in neutral position, because the notch forming the neutral lock 68 is deep enough and long enough always to lock the parts against movements from neutral position unless the handle 40 is manualy turned.

To make the shift from reverse or low speed position to intermediate or high speed position, the parts are brought to neutral position by pushing or pulling the handle 40 etc., as the case may be, whereupon the vacuum and atmospheric air will make the same passages as were recited in effecting reverse speed position when returning from low speed position, and as were recited in effecting low speed position when returning to neutral from reverse speed position. In these movements, if the handle 40 has been turned counter-clockwise to effect selection for shifting into intermediate or high speed position, the resiliency of the shaft 34 will turn the spindle 10 etc. and complete the selection as soon as neutral position has been attained. But, if the parts have been brought to neutral position without any manual turning force having been applied to the handle 40, the neutral lock 68 will have operated to stop the parts at neutral position; and then, if turning force is applied to the handle 40 in counter-clockwise direction to effect selection for shifting into intermediate or high speed position, the parts 39, 36, etc. will turn to cause the block 12 to move into the notch 8 and be entirely free from the notch 9, whereupon the handle 40 etc. may be pushed inwardly, and the same valve action and air passings to effect the shift into intermediate speed position will take place as were recited to effect shifting into reverse speed position; or, if the handle 40, etc., were pulled outwardly, the same valve action and air passings to effect the shift into high speed position would take place as were recited to effect shifting into low speed position. Of course, it is understood that the movements of the shaft 39 etc. are properly stopped by the notches 71 or 72 when making the shift into intermediate or high speed positions, respectively.

The stop-notches 69, 70, 71 and 72 are all made circumferentially long enough always to stop the shaft 39 etc., regardless of whether the selective turning force is applied to the handle 40 or not. The shifting may be made into the different speed positions by manual force only, in case the power means fails to work or in case no power energy is being supplied. In this connection, selection is effected in the same manner as was recited for power shifting; but the shifting is effected by manual force being applied by the operator to the handle 40, which force moves the shaft 39 and valve member 42 longitudinally in the direction desired and the tube 44 engages one end or the other of the slot 43 and the parts 36, 34, 10 and 12 are moved longitudinally in the same direction to effect the shift selected. Of course, it will be noted that the piston 20 during these manual shifting movements is moved with the longitudinal movements of the spindle 10.

It is obvious also that in case the power energy is insufficient to effect a shift or any part of a shift, manual force may be applied to the handle 40 to aid in effecting such shift.

It is further to be noted that any movement, including those being effected by power energy, may be stopped or reversed by simply stopping or reversing the movement of the handle 40, etc.

It is now clear that the operating means 39 is connected by lost motion connection 43, 44, to the actuating means 34, 10, etc., and also to the power means 20; that said actuating means has means 12 associated therewith for selective connection with one of the shifter elements 2 or 5; that said power means is connected to said actuating means to shift the selected element and is also connected to the valve mechanism; that both said operating means and said actuating means are mounted for rotative movements to position said actuating means selectively and for longitudinal movements to regulate said valve mechanism, and also to shift the selected element partially or completely whenever said power means partially or completely fails to do so, respectively; and that the manual means 40 is connected to said operating means to operate the same. Therefore, the valve mechanism is initially regulated by longitudinal movements of the operating means 39 and is finally regulated in a follow-up manner by the power means 20.

I do not restrict myself in any unessential respects, but what I claim and desire to secure by Letters Patent is:

1. Gear shifting mechanism of the character described comprising shifter elements, an actuator spindle mounted for rocking and longitudinal movements, means secured to said spindle for selectively engaging said elements respectively by rocking movements of said spindle and for shifting the selected element longitudinal movements of said spindle, manual means directly attached to one end of said spindle for selectively rocking said spindle, power means directly attached to the other end of said spindle for imparting shifting movements to said spindle, and means associated with said manual means to control the energization of said power means.

2. Gear shifting mechanism of the character described comprising shifter elements, an actuator for selectively shifting said elements respectively, power means directly attached to said actuator for imparting shifting movements to said actuator, manual means directly attached to said actuator for selectively moving said actuator by rotative movements of said manual means, and valve controlling means for said power means associated with said manual means and regulated by longitudinal movements of said manual means.

3. Gear shifting mechanism of the character described comprising selective shifter elements, a power means selectively engageable for shifting said elements respectively, valve means for controlling said power means, a control shaft connected to said power means and to said valve means, and manual means for rotating said shaft to selectively connect said power means with one of said elements and for regulating said valve to control said power means to shift the element selected.

4. Gear shifting mechanism of the character described comprising shifter elements, a power device for shifting said elements, a control valve for said power device, a support, manual operating means movable longitudinally in said support for regulating said control valve, a ball mounted in said support, and a notch in said operating means for engaging said ball to positively limit said longitudinal movement of said operating means in that direction.

5. Gear shifting mechanism of the character described comprising shifter elements, an actuator engageable to selectively shift said elements respectively, power means for imparting shifting movements to said actuator, a valve element movable with said actuator and having a port communicating with said power means, manual means having relatively longitudinal movement with said actuator and rotatable to selectively engage said actuator with one of said shifter elements, and a second valve element associated with said manual means movable longitudinally therewith to control passage of fluid energy through said port, whereupon said fluid operates said power means.

6. Gear shifting mechanism of the character described comprising selective shifter elements, an actuator for selectively engaging and shifting said elements, a power device connected to said actuator for moving said actuator to shift the selected element, a follow-up valve mechanism for controlling said power device, and operating means connected to a part of said valve mechanism and to said actuator for longitudinal movements for regulating said valve mechanism and also for assisting said power device to move said actuator.

7. Gear shifting mechanism of the character described comprising selective shifter elements, an actuator element for selectively engaging and shifting said shifter elements, a power element connected to said actuator element for moving said actuator element to shift the selected shifter element, a follow-up valve mechanism for controlling said power element, operating means mounted for longitudinal movements for regulating said valve mechanism and also for assisting in effecting the shift of the selected shifter element, and manual means for operating said operating means.

8. Gear shifting mechanism of the character described comprising shifter elements, a power device for shifting said elements, a support, control means for said device and a rotationally resilient and longitudinally movable shaft in said support for regulating said control means, and means cooperating with said support for positively limiting longitudinal movement of said shaft.

9. Gear shifting mechanism of the character described comprising selective shifter elements, a power device, a valve mechanism having an initial moving element and a follow-up element, an actuator supported for selective connection with one or the other of said shifter elements and being connected to said power device and to said follow-up element of said valve mechanism, and being movable to shift the selected shifter element and also to operate said follow-up element of said valve mechanism by said power device, means supported for longitudinal movements to operate said initial moving element of said valve mechanism and having connection with said actuator for assisting said power device in moving said actuator, and manual operating means connected to said last named means.

10. The combination with a selective transmission mechanism having a plurality of spaced shifter bars movable longitudinally to establish different gear relations, of a shifter member movable into engagement with one or another of said bars, means operatively connected with said shifter member for so moving the same, means including a double-acting fluid pressure motor operatively connected with said shifter member for moving the same together with the shifter bar selected thereby in opposite directions, means including valve mechanism for controlling and directing the flow of fluid power to said motor, means for controlling the operation of the first named means, and means for actuating the two last named means in order to control the energization of said motor and to actuate the first named means including a control lever movable laterally for actuating said first mentioned means and movable longitudinally for controlling said valve mechanism.

11. In a gear shifting mechanism of the type having a pair of shifting bars adapted to be selectively engaged and moved longitudinally to establish a desired gear relation, the combination therewith, of a remotely-positioned manually-operable control lever movable laterally and longitudinally in a selective gear shifting simulating manner, a shifting member, force transmitting means operatively connected with said shifting member and actuated by lateral movements of said control lever to move said member into engagement with one or the other of said shifting bars, a single double-acting power device connected with said member to actuate the latter to move either shifting bar engaged thereby in either of opposite directions, and means including valve means controlled by longitudinal movements of said control lever in opposite directions for energizing said double-acting power device to effect said last named movements of the shifting bars.

12. Gear shifting mechanism of the character described comprising a shifter element, a power device connected to said element for shifting said element, a valve for controlling said power device, a support, a manual operating means connected to said power device and to said valve movable longitudinally in said support for regulating said valve and for manually operating said device in case said valve fails to control said device.

13. Gear shifting mechanism of the character described comprising a shifter element, power means connected to said element for shifting said element, a control valve for said power means, and an operating device connected to said valve and to said element and mounted for longitudinal movements for regulating said valve and also for assisting said power means to shift said shifter element.

14. Gear shifting mechanism of the character described comprising a shifter element, power means connected to said element for shifting said element, a follow-up valve mechanism for controlling said power means, and an operating device connected to said valve mechanism and to said element and mounted for longitudinal movements for regulating said valve mechanism and also for assisting said power means to shift said shifter element.

15. Gear shifting mechanism of the character described comprising a shifter element, power means connected to said element for shifting said element, a follow-up valve mechanism for controlling said power means, an operating device connected to said valve mechanism and to said element and mounted for longitudinal movements for regulating said valve mechanism and also for assisting said power means to shift said shifter element, and manual means for operating said operating means.

16. Gear shifting mechanism of the character described comprising a shifter element, a power device connected to said element for shifting said element, a follow-up valve mechanism for controlling said power device, a manual operating means connected to said power device and to said valve mechanism and mounted for longitudinal movements for regulating said valve mechanism and for operating said power device in case said valve fails to control said power device.

17. Gear shifting mechanism of the character described comprising a shifter element, a power device connected to said element for shifting said element, a follow-up valve mechanism for controlling said device, means connected to said device and to said valve and mounted for longitudinal movements for regulating said valve and for operating said device in case said valve fails to control said device, and other means connected to said first named means for manually operating said first named means.

18. Gear shifting mechanism of the character described comprising selective shifter elements, an actuator for selectively engaging and shifting said elements, a power device connected to said actuator for moving said actuator to shift the selected element, a follow-up valve mechanism for controlling said power device, means connected to a part of said valve mechanism and to said actuator for longitudinal movements for regulating said valve mechanism and also for assisting said power device to move said actuator, and manual operating means connected to said first named means.

ELMER G. KESLING.

REFERENCES CITED

The following references are of record in the file of this patent:

UNITED STATES PATENTS

| Number | Name | Date |
|---|---|---|
| 1,258,337 | Imblum | Mar. 5, 1918 |
| 2,113,860 | Sanford | Apr. 12, 1938 |
| 1,797,853 | Bragg | Mar. 24, 1931 |
| 1,270,408 | Gray | June 25, 1918 |
| 1,175,145 | Gray | Mar. 14, 1916 |
| 2,044,463 | Burt | June 16, 1936 |
| 1,217,117 | Curtiss | Feb. 20, 1917 |
| 2,012,398 | McKenzie | Aug. 27, 1935 |
| 1,673,487 | Bice | June 12, 1928 |
| Re. 19,382 | Gaskill | Nov. 27, 1934 |
| 1,993,015 | Moorhouse | Mar. 5, 1935 |
| 1,940,236 | Alcock | Dec. 9, 1933 |
| 2,212,442 | Kliesrath | Aug. 20, 1940 |

FOREIGN PATENTS

| Number | Country | Date |
|---|---|---|
| 351,505 | Great Britain | June 29, 1931 |